UNITED STATES PATENT OFFICE.

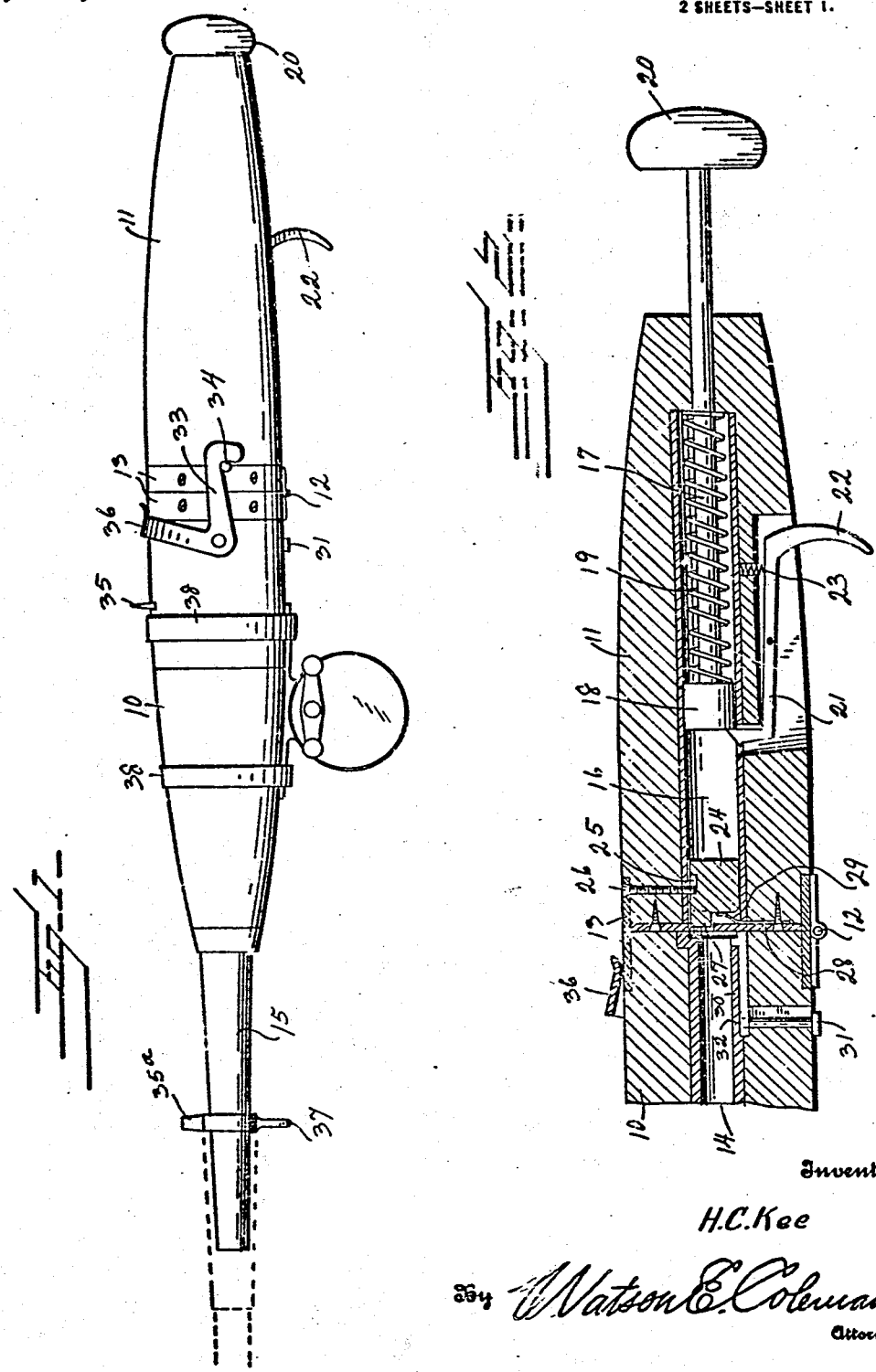
H. C. KEE.
FISHING ROD HANDLE.
APPLICATION FILED MAR. 24, 1919.
1,318,085.
Patented Oct. 7, 1919.
2 SHEETS—SHEET 1.
Inventor
H.C. Kee
By Watson E. Coleman
Attorney

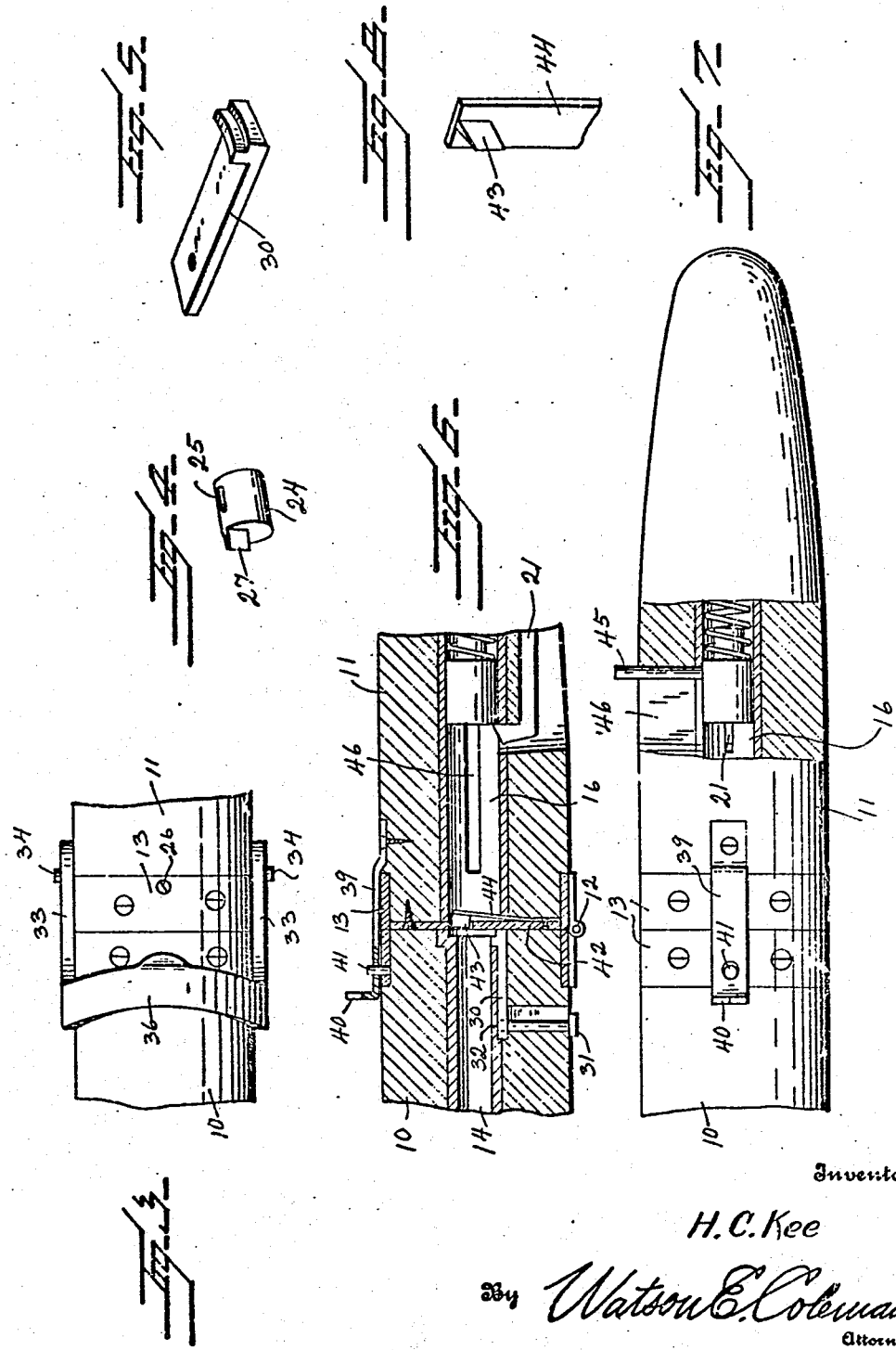

HENRY C. KEE, OF GREENVILLE, TEXAS.

FISHING-ROD HANDLE.

1,318,085.   Specification of Letters Patent.   Patented Oct. 7, 1919.

Application filed March 24, 1919. Serial No. 284,563.

*To all whom it may concern:*

Be it known that I, HENRY C. KEE, a citizen of the United States, residing at Greenville, in the county of Hunt and State of Texas, have invented certain new and useful Improvements in Fishing-Rod Handles, of which the following is a specification, reference being had to the accompanying drawings.

This invention relates to a combined fishing rod and firearm, and the general object of the invention is to provide a fishing rod having a handle and a tubular metallic shank portion, the handle being provided with a cartridge chamber and breaking in two at the middle to permit the insertion or removal of the cartridge, the handle also being provided with suitable firing mechanism.

Another object in this connection is to so form the handle and what may be termed the first joint or shank of the rod with mechanism whereby this handle and first joint may be used as a pistol.

A further object is to provide a very simple mechanism of this character which is light and which will not interfere in any way with the use of the device as a fishing rod.

A further object is to provide improved actuating mechanism for firing the cartridge and provide improved details of construction, as will hereinafter more fully appear.

Other objects will appear in the course of the following description.

My invention is illustrated in the accompanying drawings:—

Figure 1 is a side elevation of a fishing rod handle constructed in accordance with my invention;

Fig. 2 is a fragmentary longitudinal sectional view of the construction shown in Fig. 1;

Fig. 3 is a fragmentary top plan view of the construction shown in Fig. 1;

Fig. 4 is a perspective view of the firing pin;

Fig. 5 is a detail perspective view of the extractor;

Fig. 6 is a fragmentary longitudinal section of a fishing rod handle showing certain modifications;

Fig. 7 is a fragmentary top plan view of the construction shown in Fig. 6, partly broken away; and Fig. 8 is a perspective view of the firing pin and spring shown in Fig. 6.

Referring to the drawings, and particularly to Figs. 1 to 5, it will be seen that the handle of the fishing rod is composed of two sections 10 and 11 hinged to each other by a hinge 12 and reinforced by bands 13 extending around the sections of the handle at their abutting ends. The handle is hollow and the section 10 is provided with an interior barrel 14 extended to form the shank 15. The bore of this shank is uniform in diameter, but the exterior of the shank is tapered so as to fit within the collar or sleeve of the first section of the fishing rod, shown in dotted lines in Fig. 1. The fishing rod itself may be of any suitable form or character, and my invention does not relate particularly thereto.

The rear section 11 of the handle is formed with a central bore 16 within which is disposed the firing bolt 17 having a head 18, this firing bolt being urged forward by a coiled spring 19 which, at its forward end, bears against the head 18 and at its rear end bears against the rear end of the chamber 16. The rear end of the firing bolt is provided with a head 20 whereby it may be retracted. A trigger 21 of any suitable construction is pivoted within a suitable recess formed in the handle and has a finger piece or thumb piece 22 projecting out from the handle. The trigger is urged into its bolt engaging position by a spring 23.

Disposed at the forward end of the bore 16 is a firing pin 24 in the form of a block, one face of which is recessed, as at 25, and a screw 26 passes through the wall of the handle, that is through the wall of the bore 16 and into this recess so as to permit a limited longitudinal movement of the firing pin. The forward end of the firing pin is cut away so as to form a projection 27, adapted to engage with and explode a cartridge, this projection adapted to be projected through a plate 28 fastened to the inner face of the section 11 and having a slot through which the projection may operate. A spring 29 urges the firing pin rearward.

Slidingly mounted in the recess 32 in the rear end of the barrel is an extractor 30 whose rear end is segmental in form and forms part of the cartridge seat, and for the purpose of urging this extractor rearward, I have provided a thumb piece 31 disposed through a slot in the section 10 of the handle, this thumb piece extending inward and being connected to the extractor. Thus, when it is desired to extract a cartridge, the thumb piece is retracted, to partially withdraw the rear end of the spent cartridge from the barrel.

In Fig. 1 the two sections are locked in their closed position by means of oppositely disposed, pivoted locking arms 33, each arm being angularly bent at its rear extremity to engage over a stud 34 on the section 11, and these arms are connected beyond their pivotal ends by a rounded or transversely circular yoke 36 which, when the device is in engagement with the studs 34, bears against the rear end of the section 10. When it is desired to disengage the section 10 from the section 11 so as to permit the barrel to break, the yoke 36 is pushed, which retracts the locking arms from their engagement with the studs 34, thus permitting the two sections of the handle to be opened up and a cartridge extracted and a new cartridge put in place. Sights 35 and 35ª are provided which may be of any suitable construction, and below the sight 35ª, the shank 15 of the rod is provided with an eye 37 through which the fishing line may pass. Of course, the handle is provided with the usual slip rings 38 whereby a reel of the usual type may be connected to the handle.

In Figs. 6 and 7 I show another form of my device which is substantially the same as the form illustrated in Figs. 1 and 2, but differs therefrom in that the section 11 and the section 10 are held in alinement by means of a latch 39 which is formed of a resilient strip attached to the section 11, the forward end of this strip being upwardly bent, as at 40, forming a sight and provided with an opening for engagement with a stud 41 on the section 10. By this means, when the sections 10 and 11 are forced into alinement, the latch 39 will engage with the pin 41 to hold the sections in alinement and when it is desired to disengage the sections, the latch is drawn outward until it escapes from the pin 41.

In Fig. 6 I have shown the forward end of the section 11 as being closed by a circular plate 42 slotted at its middle to receive the firing pin 43, which pin is attached to a resilient tongue 44, in turn attached to the plate 42 and acting normally to retract the pin. When the bolt head or hammer head 18 strikes this spring 44, it will force the firing pin forward into engagement with the cartridge and explode the cartridge.

Again, in Fig. 7 I show another means for retracting the firing bolt 17, and in this I do not continue the bolt through the rear end of the handle, but provide a laterally projecting finger piece 45 which extends out through a slot 46 in the side wall of the bore 16.

It will be seen that I have provided a fishing rod handle which may be used with ordinary rod sections of any suitable character, but which may be also used on occasions as a firearm for projecting a relatively small caliber bullet. The weight of the various parts within the handle tends to give a good balance to the rod. It will be obvious that the mechanism within the handle will not affect in any way the elasticity or resilience of the rod sections and the use of the rod for casting, trawling, or other fishing purposes. Inasmuch as practically all the mechanism is contained within the handle, the parts will not rust, but will be fully protected.

While I have illustrated two forms of my invention which I believe to be particularly effective in use, it is to be understood that many minor changes might be made in the details of construction and arrangement of parts without departing from the spirit of the invention.

I claim:—

1. A fishing rod handle formed in two sections hinged to each other for movement into or out of alinement, a latch detachably holding the sections in alinement, the forward section having therein a centrally disposed barrel extending beyond the handle and adapted to receive a fishing rod section, the rear section being hollow and provided at its forward end with a breech plate adapted to close against the rear end of the barrel, a firing pin projectable through said breech plate but yieldingly held in a retracted position, a firing bolt mounted within the handle, a spring urging said bolt toward the firing pin, a trigger adapted to hold the bolt in a retracted position, an exteriorly disposed member operatively connected to the bolt whereby it may be shifted to its retracted position, and an extractor mounted upon the rear end of the barrel and shiftable rearward to extract the cartridge therefrom.

2. A fishing rod handle formed in two sections hinged to each other for movement into or out of alinement, pivoted latch members disposed upon one of said sections and connected by a yoke forming the thumb piece, studs projecting from the other section with which said latch members engage, a barrel extending through the forward section of the handle and projecting beyond the handle, this portion of the barrel being exteriorly tapered for engagement with a firing rod section, a sliding extractor mounted on the rear end of the barrel and having a member extending through the handle whereby the extractor may be manually operated, a breech plate extending across the bore of the rear section and closing the rear end of the barrel when the sections are in alinement, this breech plate having an opening, a firing pin disposed rearward of the breech plate and having a portion projectable through said opening, a spring urging the firing pin rearward, a sliding bolt or hammer mounted within the rear section and coacting with the firing pin, a spring urging said hammer forward, means extending to the outer face of the section whereby the hammer may be retracted, and a trigger engageable with the hammer to hold it in a retracted position until released.

In testimony whereof I hereunto affix my signature in the presence of two witnesses.

HENRY C. KEE.

Witnesses:
 MORRIS HARRELL,
 N. E. PEAK.

Copies of this patent may be obtained for five cents each, by addressing the "Commissioner of Patents. Washington, D. C."